Patented Apr. 4, 1939

2,153,312

UNITED STATES PATENT OFFICE 2,153,312

PROCESS FOR THE PREPARATION OF ISODIBENZANTHRONE

Melvin A. Perkins, Milwaukee, Wis., assignor to E. I. du Pont de Nemours & Company, Wilmington, Del., a corporation of Delaware No Drawing. Application April 23, 1938, Serial No. 203,826

3 Claims. (Cl. 260—358)

This invention relates to a new and improved process for preparing isodibenzanthrone.

It is recognized in the prior art that isodibenzanthrone may be prepared in more or less satisfactory yields and purity by several methods, such as by the alkali fusion of Bz-1-halogen benzanthrones, Bz-1-alkyl or aryl ethers of benzanthrone, or by alkaline fusions of Bz-1,Bz-1'-dibenzanthronyl selenides and sulfides. In U. S. Patent 1,924,456 a process is outlined for preparing Bz-1,Bz-1'-dibenzanthronyl selenide from Bz-1-bromobenzanthrone, and the fusion of the selenide to isodibenzanthrone. In later patents modified processes for the preparation of the dibenzanthronyl selenide and its fusion to isodibenzanthrone are described (see U. S. Patents 1,965,855; 1,954,482 and 1,972,960).

It has been recognized that in all of the processes disclosed for the preparation of Bz-1,Bz-1'-dibenzanthronyl selenide a substantial amount of impurities remains in the final product, and where a particularly pure isodibenzanthrone is desired purification of the Bz-1,Bz-1'-dibenzanthronyl selenide has always been considered to be necessary. It was found that in the process such as disclosed in Example 2 of U. S. Patent 1,965,855, a substantial amount of unchanged bromobenzanthrone remained in the final product, and there was also present some Bz-1-benzanthronyl alkali metal selenolate. To obtain a pure Bz-1,Bz-1'-dibenzanthronyl selenide the resulting product was extracted with sodium sulfide solution to remove excess selenium and recrystallized from nitrobenzene, as more particularly described in Example 3 of U. S. Patent 1,924,456.

I have now found that, surprising as it may seem, the crude Bz-1,Bz-1'-dibenzanthronyl selenide which is prepared in alcohol with an alkali metal selenide can be fused directly in the alcohol solution in which it is prepared with alkali to isodibenzanthrone, and that the resulting isodibenzanthrone is of substantially the same purity as originally obtained from a purified Bz-1,Bz-1'-dibenzanthronyl selenide. Where a loss in yield is always experienced in the fusion of the substantially pure Bz-1,Bz-1'-dibenzanthronyl selenide to the isodibenzanthrone, the same loss is experienced from the crude dibenzanthronyl selenide and impurities (combined) resulting in an actual increase in yield based on the Bz-1,Bz-1'-dibenzanthronyl selenide actually employed. It appears that the impurities, such as the bromobenzanthrone in this particular crude Bz-1,Bz-1'-dibenzanthronyl selenide, take the place in those side reactions which is ordinarily taken by part of the pure Bz-1,Bz-1'-dibenzanthronyl selenide itself. I have found that not only a higher yield of isodibenzanthrone based on pure Bz-1,Bz-1'-dibenzanthronyl selenide present in the mass is obtained by this new process, but that the procedure is materially simplified where the crude Bz-1,Bz-1'-dibenzanthronyl selenide is not isolated but fused directly in the same solution in which it is formed to the isodibenzanthrone.

I have also found that similar results may be obtained in preparing isodibenzanthrone over the dibenzanthronyl sulfide route, where the sulfide is originally prepared in alcohol, as distinguished from the process of U. S. Patent 1,712,646, although dyeings of the isodibenzanthrone resulting from the process are somewhat bluer in shade than those from the isodibenzanthrone prepared over the selenide route.

It is therefore an object of this invention to provide a new and improved process for the preparation of isodibenzanthrone directly from Bz-1-bromobenzanthrone over the selenide or sulfide route, which is simple in operation and gives a product equally as pure as that obtained from pure Bz-1,Bz-1'-dibenzanthronyl selenide or sulfide, respectively.

It is a further object of the invention to provide a process for the preparation of isodibenzanthrone in which the Bz-1,Bz-1'-dibenzanthronyl selenide or sulfide is fused with caustic alkali in the same alcohol suspension in which it is formed without isolation or elimination of impurities which have been formed in the initial reaction.

The following examples are given to illustrate the invention more fully. The parts used are by weight.

Example 1

7.6 parts of sodium in the form of thin strips are dissolved at 50-70° C. in a suspension of 8.7 parts of selenium powder in 160 parts of ethyl alcohol. 61.8 parts of pure Bz-1-bromobenzanthrone (M. P. 170-172° C.) are added and the mixture refluxed for about 18 hours, until a small test sample dissolves in concentrated sulfuric acid with a blue-green coloration. The alcoholic suspension of selenated product is cooled somewhat and 160 parts of granular potassium hydroxide are carefully added under good agitation. The melt is heated to reflux (about 117 to 120° C.) and maintained at that point until no further dyestuff formation occurs. The melt is then drowned in 450 parts of water containing 15 parts of sodium bisulfite, the slurry heated to 80° C., air-blown for a few minutes to precipitate traces of dissolved dyestuff, and filtered after dilution with a solution of 20 parts of sodium bisulfite in 2200 parts of hot water. The isodibenzanthrone is obtained in quantitative yield after washing alkali-free and drying. It is in the form of clean-cut gray needle-like crystals, the dry solid appearing slate-gray with a greenish sheen. The selenium can be recovered by acidification of the filtrate at the boil, followed by filtration.

*Example 2*

16 parts of selenium powder are suspended in 300 parts of denatured alcohol and 14 parts of sodium, in the form of small chunks or strips, added at such a rate that the mass warms itself to a maximum of about 70° C. The mass is then refluxed for ½ hour to insure complete solution of sodium, after which it is cooled slightly and 115 parts of Bz-1-bromobenzanthrone are added. The well-agitated suspension is then refluxed for 20 hours, cooled to 30° C. and treated with 300 parts of caustic potash flakes at such a rate that the temperature does not exceed 70° C. The alcoholic caustic mass is heated to 127° C., while distilling off a small amount of alcohol, and maintained at 125–130° C. for 3 hours. At the end of this time, the mass is cooled to below 100° C. and carefully diluted with a solution of 20 parts of sodium bisulfite in 280 parts of water, after which the bulk of the alcohol is distilled off. The aqueous melt is then drowned in enough water to give a total volume of about 4000 parts (as water) and 50 parts additional sodium bisulfite are added. The slurry is heated to 80 to 90° C., filtered, and the filter cake washed alkali-free.

The product is so free of dibenzanthrone and/or other dyeing impurities that it is essentially unvattable unless put in special physical form, and is also largely insoluble in 93% sulfuric acid, from which it separates in uniform clean-cut needle crystals of a yellowish green color.

*Example 3*

61.8 parts of pure Bz-1-bromobenzanthrone are refluxed with 15 parts of pulverized 60% sodium sulfide in 150 parts of denatured alcohol until the mass as a whole is yellow-brown in color and a small test sample gives a bright blue coloration in concentrated sulfuric acid. It is then cooled to 70° C. and 150 parts caustic potash flakes are added. It is then heated to 125° C. with distillation of a part of the alcohol if necessary. The mass is stirred for 3 hours at 125–130° C., or until the dyestuff formation is complete. The dyestuff is isolated by drowning, aerating, filtering, and washing. Dyeings of the isodibenzanthrone so obtained are noticeably more bluish in shade than those obtained over the selenide route. The product is essentially free of bromine and of sulfur, and is obtained in good yield.

*Example 4*

To a slurry of 4 parts of sulfur in 150 parts of denatured alcohol 7 parts of sodium in the form of thin strips are added, at such a rate that the temperature does not exceed 70° C. The mass is agitated until the sodium is entirely dissolved, then 61.8 parts of pure Bz-1-bromobenzanthrone are added and the suspension is refluxed at 80° C. for 20 hours, at the end of which time the Bz-1,Bz-1'-dibenzanthronyl sulfide formation is substantially complete. It is then cooled to 70° C. or below and 150 parts of potassium hydroxide are added. It is then heated to 125–130° C. with distillation of as much alcohol as necessary and maintained until dyestuff formation is complete. The product is similar to that of Example 3.

It will be obvious to those skilled in the art that this process is also applicable in the preparation of substituted isodibenzanthrone compounds in which the substituent is not effected by the alcoholic caustic fusion to which these intermediate products are subjected. Other alcohols than ethyl alcohol may of course be employed, although it has been found that ethyl alcohol is preferred. The quantity of alcohol, sodium, and selenium or sulfur may be varied within reasonable limits without materially effecting the process. The time and temperature of the fusion may also be varied so long as complete condensation is obtained. The presence of as high as 10% Bz-1-bromobenzanthrone in the intermediate Bz-1,Bz-1'-dibenzanthronyl selenide appears to have little effect on the purity of the resulting isodibenzanthrone, although quantities in excess of 10% lower the yield of the desired isodibenzanthrone.

This process permits the preparation of isodibenzanthrone of a purity which could heretofore be obtained only with relatively pure Bz-1,Bz-1'-dibenzanthronyl selenide and makes the isolation and purification of the intermediate unnecessary, thereby materially reducing the cost, since the large amounts of alcohol necessary for the purification of the intermediate dibenzanthronyl selenide as well as the extra labor can be dispensed with.

I claim:

1. In the process for preparing isodibenzanthrone from compounds of the class consisting of Bz-1,Bz-1'-dibenzanthronyl selenide and Bz-1,Bz-1'-dibenzanthronyl sulfide wherein the selenide and sulfide are prepared in alcoholic medium, the step which comprises fusing the dibenzanthronyl selenide or sulfide with caustic alkali in the same alcohol medium in which it has been formed, without removal of the impurities which are present, prior to the alkali fusion.

2. In the process for preparing isodibenzanthrone wherein Bz-1,Bz-1'-dibenzanthronyl selenide is prepared in alcoholic suspension, the step which comprises fusing the Bz-1-dibenzanthronyl selenide with caustic alkali in the same alcoholic suspension in which it has been formed and in the presence of the impurities normally occurring in the alcoholic suspension of the Bz-1,Bz-1'-dibenzanthronyl selenide.

3. The process which comprises reacting Bz-1-bromobenzanthrone with an alkali metal selenide in alcohol to form Bz-1,Bz-1'-dibenzanthronyl selenide, adding caustic alkali to the alcoholic suspension and heating to convert the Bz-1,Bz-1'-dibenzanthronyl selenide to isodibenzanthrone, the fusion being carried out in the presence of the impurities normally occurring in the alcoholic selenation mass.

MELVIN A. PERKINS.